REMOTE CRYSTAL SWITCHING FOR OSCILLATORS

Filed Sept. 30, 1953

A.H. HARGROVE
*INVENTOR.*

*BY*
*Killman and Kerst*
ATTORNEYS

United States Patent Office 2,777,063

Patented Jan. 8, 1957

2,777,063

REMOTE CRYSTAL SWITCHING FOR OSCILLATORS

Atwood H. Hargrove, Baltimore, Md., assignor to Bendix Aviation Corporation, Towson, Md., a corporation of Delaware Application September 30, 1953, Serial No. 383,206

3 Claims. (Cl. 250—36)

Figure 1:
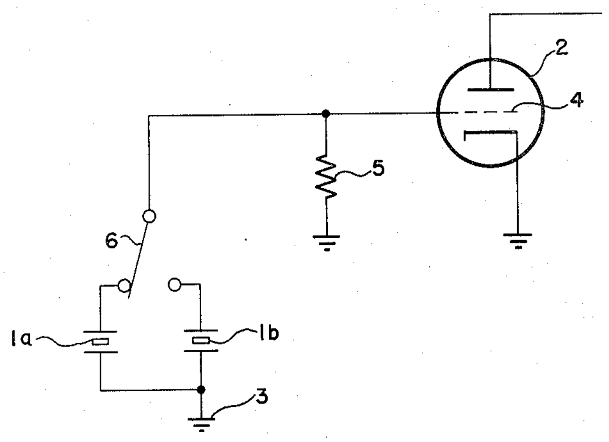

This invention relates to high frequency oscillators employing a plurality of crystals and in particular, to a method for remotely switching crystals in a high frequency oscillator.

Previously, crystal switching in high frequency oscillators has been performed in several fashions. One method is to physically replace the controlling crystal with one capable of furnishing the characteristics necessary for the oscillator to produce the desired frequency. Another method is to provide a switching means at the location of the crystals. Still another method of switching is to provide at the location of the crystals a relay that can be operated from a remote position. Obviously the first two methods cannot be operated from a remote position, while the third method, although capable of being operated from a distance, has undesirable features. These features include the fact that it introduces a component which requires additional space, power and maintenance. With the growing tendency for miniaturization, reliability, and portability, a system reducing the number of components is desirable.

An object of the present invention is to provide a means for remotely switching crystals in a high frequency oscillator.

Another object is to provide a means for switching crystals that does not require power.

A further object is to disclose a reliable method for switching crystals in a high frequency oscillator.

A still further object is to provide a means for switching crystals that is suitable for miniaturized assemblies.

These and other objects are realized in a system where a plurality of crystals in a high frequency oscillator are individually coaxially connected to a ground reference through a plurality of inductors, such that the distributed capacitances of the individual coaxial lines in conjunction with the inductances of their respective inductors, form high impedance circuits, at the resonant frequencies of the respective crystals, between the crystals and the ground reference. A selector switch connected so that the inductors may be individually short-circuited is provided such that by electrically removing the effect of an inductor, the oscillator will oscillate at the frequency of the crystal associated with that inductor by virtue of the removal of the high impedance path.

Figure 2:
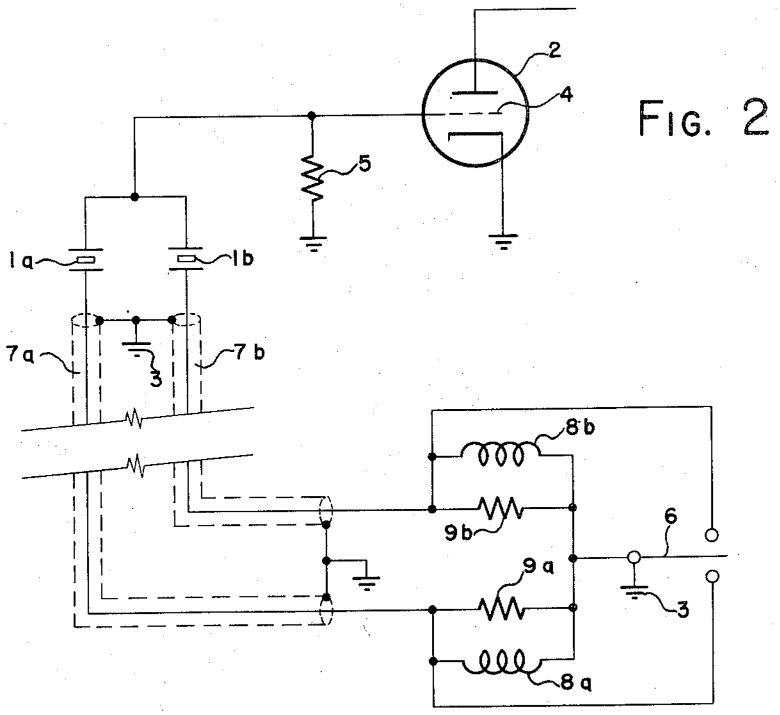

Referring to the drawings:

Fig. 1 is a schematic diagram illustrating a portion of a high frequency oscillator; and Fig. 2 is a schematic diagram illustrating the use of the invention in the same portion of the high frequency oscillator as shown in Fig. 1.

More particularly, Fig. 1 is a schematic diagram illustrating the connections necessary in the crystal section of a typical high frequency oscillator when the crystal selecting is to be performed at the location of the crystals. The crystals 1*a* and 1*b* are individually connected by a switch 6 between the grid 4 of a tube 2 and a ground reference 3. A resistor 5 connected between the grid 4 and the ground reference 3 privodes a biasing means for the tube 2. The switch 6 may be a relay for remotely controlling the switching action. The frequency at which the circuit will oscillate will be determined by the series resonant frequency of the crystal connected into the circuit. This method of crystal switching is well known in the art.

Fig. 2 is a schematic diagram illustrating an arrangement in accordance with the invention incorporated in the section of the oscillator shown in Fig. 1. The crystals 1*a* and 1*b*, the tube 2, the ground reference 3, the grid 4 and the resistor 5 perform the same functions as the similarly designated components in the schematic diagram of Fig. 1. Coaxial lines 7*a* and 7*b* connect the crystals 1*a* and 1*b* to the remotely located controlling position. Inductors 8*a* and 8*b* are serially connected between the coaxial lines 7*a* and 7*b* and the ground reference 3. Their inductance characteristics are such that high impedances at the series resonant frequencies of the crystals 1*a* and 1*b* exist between the crystals 1*a* and 1*b* and the ground reference 3. The switch 6 is so connected that it may remove the electrical effect of one of the inductors 8*a* or 8*b*. When an inductor 8*a* or 8*b* is electrically removed, a low impedance exists between its respective crystal 1*a* or 1*b* and the ground reference 3, thereby causing the oscillator to operate at a frequency determined by that crystal 1*a* or 1*b*. Resistors 9*a* and 9*b* are provided for reducing the Q of the inductors 8*a* and 8*b* such that when the inductors 8*a* and 8*b* are not electrically deleted, the parallel resonant circuit formed by the combination of the distributed capacitance of the coaxial lines 7*a* and 7*b* and the inductance of the inductors 8*a* and 8*b* will not form detrimental ringing circuits in the oscillator.

Although two crystals were employed in a portion of a typical high frequency oscillator, it is to be understood that any number of crystals and any type of oscillator may be employed.

What is claimed is:

1. In a high frequency oscillator containing a plurality of crystals for determining the frequency of operation thereof, a crystal switching means comprising: a plurality of coaxial lines corresponding in quantity to said crystals; each of said coaxial lines being serially connected to a respective one of said crystals; a point of junction being formed by the remaining terminals of said crystals; a plurality of inductors equal in quantity to said coaxial lines; each of said inductors being serially connected to the remaining extremity of a respective one of said coaxial lines; the reactance values of the said inductors being equal in magnitude but opposite in polarity to the respective reactance values of said coaxial lines, all of said reactance values being measured at the resonant frequencies of the respective crystals; a second point of junction being formed by the remaining terminals of said inductors; a plurality of conductors, each connected in parallel with a respective one of said inductors and being normally interrupted; and switching means operable to complete any selected one of said conductors, each of said conductors, when completed, removing the effect of the associated inductor from the serial combination of elements such that the frequency of operation of said oscillator is determined by the associated crystal.

2. In a high frequency oscillator containing a plurality of crystals for determining the frequency of operation thereof, a crystal switching means comprising: a plurality of coaxial lines corresponding in quantity to said crystals; each of said coaxial lines being serially connected to a respective one of said crystals; a point of junction being formed by the remaining terminals of said crystals; a plurality of reactive elements equal in quantity to said coaxial lines; each of said reactive elements being serially connected to the remaining extremity of a respective one of said coaxial lines; the reactance values of the said reactive elements being equal in magnitude but opposite in polarity to the respective reactance values of said coaxial lines, all of said reactance values being measured at the resonant frequencies of the respective crystals; a second point of junction being formed by the remaining terminals of said reactive elements; a plurality of conductors, each connected in parallel with a respective one of said inductors and being normally interrupted; and switching means operable to complete any selected one of said conductors, each of said conductors, when completed, removing the effect of the associated reactive element from the serial combination of elements such that the frequency of operation of said oscillator is determined by the associated crystal.

3. In a high frequency oscillator containing a plurality of crystals for determining the frequency of operation thereof, a crystal switching means comprising: a plurality of coaxial lines corresponding in quantity to said crystals; each of said coaxial lines being serially connected to a respective one of said crystals; a point of junction being formed by the remaining terminals of said crystals; a plurality of reactive elements equal in quantity to said coaxial lines; each of said reactive elements being serially connected to the remaining extremity of a respective one of said coaxial lines; the reactance values of the said reactive elements being equal in magnitude but opposite in polarity to the respective reactance values of said coaxial lines, all of said reactance values being measured at the resonant frequencies of the respective crystals; a second point of junction being formed by the remaining terminals of said reactive elements; a plurality of resistors corresponding in quantity to said reactive elements; each of said resistors being connected in parallel with a respective one of said reactive elements; a plurality of conductors, each connected in parallel with a respective one of said inductors and being normally interrupted; and switching means operable to complete any selected one of said conductors, each of said conductors, when completed, removing the effect of the associated reactive element from the serial combination of elements such that the frequency of operation of said oscillator is determined by the associated crystal.

References Cited in the file of this patent

UNITED STATES PATENTS 2,553,366 Fry ---------------- May 15, 1951

FOREIGN PATENTS 107,163 Australia ---------------- Apr. 11, 1939